Patented Nov. 15, 1949

2,488,487

UNITED STATES PATENT OFFICE 2,488,487

PRODUCTION OF ALKYL SILICON HALIDES

Arthur J. Barry, Midland, and Lee De Pree, Holland, Mich., assignors to The Dow Chemical Company, Midland, Mich., a corporation of Delaware No Drawing. Application February 7, 1946, Serial No. 646,200

15 Claims. (Cl. 260—448.2)

This invention relates to an improved process for the production of alkyl silicon halides. It is particularly concerned with the preparation of lower alkyl silicon halides containing less than four carbon atoms in each alkyl radical.

In United States Patents Nos. 2,380,995–2,381,002 it is shown that silicon may be reacted with a halo-hydrocarbon to produce hydrocarbon-substituted silicon halides, and that the reaction may be catalyzed by the presence in the reaction zone of a metal such as copper, nickel, silver, tin, titanium, etc. According to the methods of the art, when an alkyl halide, for example, methyl chloride, is passed over heated silicon or a silicon-copper alloy, there is usually obtained a complex mixture of products, containing various silicon derivatives such as methyl silicon trichloride, dimethyl silicon dichloride, trimethyl silicon chloride, tetramethyl silane, silicon tetrachloride, trichlorosilane, etc. Inasmuch as the halo-hydrocarbon serves to provide all of the halogen found in the reaction products, the yield of organo silicon halides is low on a basis of the alkyl halide consumed in the reaction.

We have found that, upon contact of an alkyl halide with silicon or an alloy or mixture of silicon with a metal, at an elevated temperature, increased yields of the more valuable monoalkyl silicon halides may be obtained by the simultaneous introduction of a hydrogen halide, e. g. HCl, along with the alkyl halide. Apparently the hydrogen halide serves to provide a considerable portion of the halogen content of the products. When, for example, a mixture comprising a lower alkyl halide, particularly a lower alkyl chloride or bromide, having less than four carbon atoms in the molecule, and hydrogen chloride or hydrogen bromide, is reacted with silicon or a silicon alloy according to the method of this invention, a monoalkyl silicon trihalide and a monoalkyl silicon dihalide are obtained as the major reaction products, together with a trihalosilane, usually a silicon tetrahalide and in some instances one or more other products, e. g. a dialkyl silicon dihalide, an alkyl silicon monohalide, etc.

Because of the fact that the principal products of the reaction are hydrolyzable, it is important that the starting materials be substantially anhydrous, e. g. the alkyl halide is usually dried to an extent such as to contain less than one per cent by weight of water prior to use in the reaction. Usually from 0.5 to 20 parts by volume of the hydrogen halide are employed per part of the vaporized alkyl halide, but the hydrogen halide may be used in proportions greater or smaller than those just stated. In general, the yield of a monoalkyl silicon trihalide, based on the alkyl halide reactant, increases with increase in the ratio of a hydrogen halide to the alkyl halide in the starting materials.

The ease with which the reaction may be carried out and the yields of the monoalkyl silicon halides vary, of course, depending upon the particular alkyl halide employed as the starting material and the conditions under which the reaction is conducted, such as the reaction temperature, the time of contact of the reactants, the quality and particle size of the silicon or silicon alloy, etc. We have found, for instance, that alkyl halides containing less than four carbon atoms in the molecule, particularly methyl halides and ethyl halides, react with silicon or its alloys to produce corresponding monoalkyl silicon trihalides more readily than do higher alkyl halides.

A wide variety of silicon alloys, or corresponding silicon and metal mixtures, as well as commercially pure silicon are satisfactory as sources of silicon for the reaction herein described. Examples of silicon alloys or mixtures which may be used are: calcium-silicon alloys, calcium-manganese-silicon alloys, manganese-zirconium-silicon alloys, iron-silicon alloys, titanium-silicon alloys, zirconium-silicon alloys, calcium-titanium-aluminum zirconium-boron-iron-silicon alloys, copper silicon alloys, intimate mixtures of silicon with copper, nickel, tin, or silver, etc. Commercially pure silicon or ferrosilicon of greater than 75 per cent silicon content may be advantageously employed. The silicon or silicon alloy is usually employed in the form of granules, e. g. of from 4 to 200 mesh size, that it may be used in the form of particles or lumps which are finer or coarser than just stated.

One procedure for carrying out the process comprises conducting the alkyl halide admixed with the hydrogen halide, over and through a stationary bed of silicon, or a silicon alloy maintained at a reaction temperature. Another procedure consists in simultaneously passing vapors of the alkyl halide and hydrogen halide through a rotating externally heated tumbler containing the silicon, or silicon alloy. Still another mode of operation consists in preheating the vapor mixture to the desired temperature before contacting the silicon or silicon alloy. Once initiated, the reaction is exothermic. Reaction between alkyl halides and silicon, or its alloys, is usually effected within a temperature range of from 200° to 550° C., but higher or lower temperatures may in some instances be employed. The optimum temperature varies with changes in the kind of alkyl halide employed, the quality and particle size of the silicon or silicon alloy, etc. The reaction is usually carried out at atmospheric pressure or thereabout, but lower or much higher pressures, e. g. pressures as high as 2000 pounds per square inch, may be employed. Apparently, the pressure has little, if any, effect on the reaction. Diluents such as carbon dioxide, carbon monoxide, silicon tetrachloride, trichlorosilane, etc., may also be added.

The rate of vapor flow is preferably controlled so as to cause consumption of 0.5 or more of the alkyl halide in a single passage through the bed of silicon or its alloy. However, it sometimes is difficult to attain such high conversion in a single pass, in which case a considerable portion, e. g. from 0.5 to 0.8 of the vapors flowing from the bed may be recirculated through the latter so as to cause further consumption of the alkyl halide. Such recirculation of the vapors is of further advantage in that it renders more nearly uniform the temperature throughout the reaction zone and it tends to cause the reaction to take place throughout a large portion of the silicon bed rather than to occur locally in minor portions of the bed. While operating as just described, at least a portion of the vapors flowing from the silicon bed is withdrawn from the reaction system and cooled to condense the alkyl silicon trihalide product. The latter is thereafter separated from the by-products and purified, e. g. by fractional distillation.

Operation as just described may be continued until the silicon is largely consumed. If desired, provision may be made for withdrawing spent solids, e. g. finely divided iron or iron chloride, etc., from the reaction zone and for introducing fresh quantities of silicon, or an alloy thereof, into said zone during the reaction, in which case the reaction may be carried out in continuous, rather than intermittent, manner. The reaction may also be carried out continuously by alternately employing two or more reactors in the process and charging one such reactor with the bed of silicon, or a silicon alloy, while another reactor, containing such bed, is in service.

Although the reaction is preferably carried out in the intermittent or continuous ways just described, it may, if desired, be accomplished in batchwise manner, e. g. a bomb or autoclave may be charged with the alkyl halide and silicon, or a silicon alloy, and the mixture be heated under pressure to the reaction temperature. Thereafter vapors of the products may be withdrawn from the reactor and the products be separated as hereinbefore described.

The following examples describe a number of ways in which the principle of the invention has been applied, but are not to be construed as limiting the invention.

EXAMPLE 1

This example, showing practice under conditions outside the scope of the invention, is presented for purpose of illustrating results obtained when the hydrogen halide, required as a starting material in the process of the invention, is omitted. Into a tubular iron tumbler, eight inches in diameter and six feet long, was charged commercially pure silicon (approximately 97 per cent silicon) in the form of small lumps and particles capable of passing through a one mesh screen. The loaded reactor was externally heated, i. e. by means of gas burners, to a temperature of approximately 500° C., while being rotated at a rate of about 15 revolutions per minute, on its longitudinal axis, and maintained at approximately said temperature with rotation throughout the ensuing reaction. The temperature was measured by means of thermocouples in thermocouple wells projecting into the reaction zone at a number of points. Methyl chloride vapor was passed through the heated silicon at a rate of approximately 71 cubic feet per hour, expressed as at room temperature and atmospheric pressure. The gases issuing from the reactor were condensed by cooling the same to −70° C. Subsequent fractional distillation of the condensate gave the following analysis, expressed as parts by weight:

| Ingredient | Parts |
| --- | --- |
| $DSiCl_3$ | 2.1 |
| $CH_3SiHCl_2$ | 3.9 |
| $SiCl_4$ | 27.3 |
| $CH_3SiCl_3$ | 22.2 |

A large portion of unreacted methyl chloride was also recovered. The yield of methyl silicon chlorides approximated three per cent of theoretical, based on the content of methyl radicals in the quantity of methyl chloride employed as a starting material.

EXAMPLE 2

A vapor mixture comprising 65.3 per cent by volume of methyl chloride, and 34.7 per cent of hydrogen chloride was passed at a rate of approximately seven cubic feet per hour in a tumbler charged with silicon as described in Example 1. During passage of the vapor mixture through the silicon, the reaction mixture was maintained at a temperature of approximately 300° C., with rotation of the reaction vessel. Gaseous products issuing from the reactor were condensed and subsequently purified by fractional distillation. The condensate was found to contain 23.7 per cent by weight of $HSiCl_3$, 3.1 per cent of $CH_3SiHCl_2$, 21.6 per cent of $SiCl_4$ and 41.0 per cent of $CH_3SiCl_3$. unreacted methyl chloride was also recovered. The yield of methyl silicon chlorides approximated 8.5 per cent, based on the methyl chloride introduced.

EXAMPLE 3

This example which illustrates the reaction of methyl chloride, free of hydrogen chloride, with silicon in the presence of copper, is presented for comparison with Example 4, in which a vapor mixture of methyl chloride and hydrogen chloride is employed under otherwise similar conditions. To commercially pure silicon, 100 mesh and under in size, was added sufficient powdered cuprous chloride to give a mixture containing one part by weight of copper for each ten parts of silicon. The mixture was ball-milled for twenty-four hours. Approximately thirty pounds of the product was charged into the tumbler reactor described in Example 1 and heated to a temperature of approximately 300° C. over a period of about one hour, while rotating the tumbler. During this period, silicon tetrachloride was liberated and withdrawn from the reactor. Methyl chloride vapor was then introduced at a rate of approximately 20.6 cubic feet per hour, and the products of reaction withdrawn and condensed. The condensate contained 3.8 parts by weight of $(CH_3)_3SiCl$, 11.1 parts of $CH_3SiCl_3$ and 46.9 parts of $(CH_3)_2SiCl_2$ together with minor amounts of $SiCl_4$ and $SiHCl_3$. Unreacted methyl chloride was also recovered. The yield of methyl chlorosilanes approximated 42.2 per cent, based on the methyl chloride introduced.

EXAMPLE 4

A gaseous mixture of 55 per cent by volume of methyl chloride and 45 per cent of hydrogen chloride was passed at the rate of 20 cubic feet per hour into a tumbler charged with copper-bearing silicon as described in Example 3. During the reaction, the silicon was heated at 300° C. There was obtained a condensate having the following composition, expressed as parts by weight:

| Ingredient | Parts |
|---|---|
| $HSiCl_3$ | 9.2 |
| $CH_3HSiCl_2$ | 15.7 |
| $SiCl_4$ | 6.5 |
| $(CH_3)_3SiCl$ | 2.3 |
| $CH_3SiCl_3$ | 24.4 |
| $(CH_3)_2SiCl_2$ | 7.7 |

Unreacted methyl chloride was also recovered. The yield of methyl chlorosilanes approximated 73 per cent based on the methyl chloride introduced. It may thus be seen that admixture of hydrogen chloride with the starting methyl chloride results in greatly increased yields of monomethyl silicon chlorides.

Results similar to those just described are obtained when an intimate mixture of powdered silicon and powdered copper in proportions corresponding to the above-mentioned "copper-bearing silicon" is substituted in place of the latter.

EXAMPLE 5

This example, which illustrates the use of ethyl chloride, free of hydrogen chloride, as a starting material is presented for comparison with Example 6 showing the use of a vapor mixture of ethyl chloride and hydrogen chloride under otherwise similar conditions. A tubular iron reactor, four inches in diameter and eight feet long was filled with ferrosilicon of 75 per cent silicon content. The particles were of a size capable of passing through a one mesh screen. During the experiment, the bed of ferrosilicon was externally heated to an average temperature of approximately 325° C. Ethyl chloride vapor was passed through the column of heated ferrosilicon at a rate of approximately 1.4 cubic feet per hour. Gaseous products were recirculated through the heated ferrosilicon at a rate of 100 cubic feet per hour, while withdrawing a portion of said vapors at the rate of 1.4 cubic feet per hour. Effluent gases were condensed by cooling the same to −70° C. The condensate was subsequently fractionally distilled. For each gram mol of ethyl chloride introduced, there was obtained 0.04 gram mol of ethyl silicon trichloride. Silicon tetrachloride and silico-chloroform were also obtained.

In another experiment, in which the reaction products were not recirculated, but were withdrawn directly and condensed, there was obtained 0.02 gram mol of ethyl silicon trichloride for each mol of ethyl chloride introduced.

EXAMPLE 6

Ethyl chloride vapor admixed with hydrogen chloride was reacted with ferrosilicon by procedure similar to that described in the first experiment of Example 5. In the table are listed two experiments, in each of which a portion of the gaseous products was recirculated through the bed of heated ferrosilicon. In both runs, the average temperature of the ferrosilicon was maintained at 325° C. The table gives the composition of the vapors introduced into the reactor, expressed as per cent by volume, the rate of flow of said vapors, and the yield of ethyl silicon trichloride expressed as gram mols thereof per gram mol of ethyl chloride introduced.

Table

| Run No. | Vapor Composition | | Rate of Flow, Cu. Ft./Hr. | $C_2H_5SiCl_3$, Gram Mol |
|---|---|---|---|---|
| | Per Cent $C_2H_5Cl$ | Per Cent HCl | | |
| 1 | 23 | 76.7 | 3.8 | 0.19 |
| 2 | 7.4 | 92.6 | 6.4 | 0.40 |

Silicon tetrachloride and silico-chloroform were also produced.

EXAMPE 7

In each of a series of experiments, A, B, and C, a mixture of ethyl chloride and hydrogen chloride gas was passed through the rotating tumbler reactor described in Example 1, which reactor was charged with a mixture consisting of 10 parts by weight of 100 mesh silicon and 1 part of finely divided metallic copper.

A. At a rate of approximately 20.8 cubic feet per hour, a vapor mixture comprising 25.5 per cent by volume of ethyl chloride and 74.5 per cent of hydrogen chloride was introduced into the tumbler reactor charged as above, and externally heated at an average temperature of 300° C. The gases issuing from the reactor were condensed and fractionally distilled. The condensate had the following composition, expressed as parts by weight:

| Ingredient | Parts |
|---|---|
| $HSiCl_3$ | 10.3 |
| $SiCl_4$ | 19.0 |
| $C_2H_5SiHCl_2$ | 1.7 |
| $C_2H_5SiCl_3$ | 42.5 |
| $(C_2H_5)_2SiCl_2$ | 2.8 |
| $(C_2H_5)_3SiCl$ | 6.0 |

B. In this experiment, the vapor mixture which comprised 28.2 per cent of ethyl chloride and 71.8 per cent of hydrogen chloride, was introduced at a rate of approximately 21.6 cubic feet per hour into the tumbler reactor freshly charged as above. During the run, an average temperature of 275° C. was maintained by means of external heating of the rotating tumbler. There was obtained a condensate having the following composition:

| Ingredient | Parts |
|---|---|
| $HSiCl_3$ | 7.1 |
| $SiCl_4$ | 7.5 |
| $C_2H_5SiHCl_2$ | 3.9 |
| $C_2H_5SiCl_3$ | 47.8 |
| $(C_2H_5)_2SiCl_2$ | 3.8 |
| $(C_2H_5)_3SiCl$ | 7.1 |

C. In this run, the vapor mixture, comprising 26.5 per cent of ethyl chloride and 73.5 per cent of hydrogen chloride, was introduced at a rate of approximately 20.8 cubic feet per hour into the freshly charged tumbler reactor. The average temperature for the run was 255° C. The condensate had the following composition:

| Ingredient | Parts |
| --- | --- |
| $HSiCl_3$ | 6.3 |
| $SiCl_4$ | 8.1 |
| $C_2H_5SiHCl_2$ | 13.4 |
| $C_2H_5SiCl_3$ | 59.8 |
| $(C_2H_5)_2SiCl_2$ | 8.7 |
| $(C_2H_5)_3SiCl$ | 2.2 |

From the examples given above it may be seen that the reaction of a mixture of alkyl chloride and hydrogen chloride with silicon results in greatly increased yields of alkyl silicon chlorides per unit of alkyl chloride employed as starting materials. Furthermore, our improved process results in a product containing greater proportions of monoalkyl silicon trichloride and monoalkyl dichlorosilane than may be obtained without the introduction of hydrogen chloride in admixture with the alkyl chloride starting material.

The process as described is not limited to methyl chloride and ethyl chloride as the starting alkyl halide, but is also applicable to other halides, e. g., methyl bromide, ethyl bromide, propyl bromide, propyl chloride, methyl fluoride, etc.

This application is a continuation-in-part of our copending application Serial No. 572,978, filed January 15, 1945, now abandoned.

Other modes of applying the principle of the invention may be employed instead of those explained, change being made as regards the compounds and materials herein disclosed, provided the steps or compounds stated by any of the following claims or equivalent of such steps or compounds be employed.

We therefore point out and claim:

1. A method of forming an alkyl silicon halide which comprises bringing a gaseous hydrogen halide and an alkyl halide containing less than four carbon atoms in the molecule into contact with silicon and heating the silicon together with a vapor mixture of the hydrogen halide and the alkyl halide at a reaction temperature below 550° C.

2. A method of forming an alkyl silicon halide which comprises passing a vapor mixture of an alkyl halide containing less than four carbon atoms in the molecule and a gaseous hydrogen halide into contact with silicon while maintaining the resultant mixture at a reaction temperature of from 200° to 550° C.

3. A method of forming an alkyl silicon halide which comprises passing a vapor mixture of an alkyl halide containing less than four carbon atoms in the molecule and a gaseous hydrogen halide into contact with an alloy of silicon while maintaining the resultant mixture at a reaction temperature of from 200° to 550° C.

4. A method of forming a methyl silicon halide which comprises passing a vapor mixture of methyl halide and a gaseous hydrogen halide into contact with silicon while heating the resultant mixture at a reaction temperature below 550° C.

5. A method of forming a methyl silicon chloride which comprises passing a vapor mixture of methyl chloride and gaseous hydrogen chloride into contact with silicon while heating the resultant mixture at a reaction temperature of from 300° to 450° C.

6. A method of forming mono-methyl dichlorosilane which comprises passing a vapor mixture of methyl chloride and gaseous hydrogen chloride into contact with silicon while heating the resultant mixture at a reaction temperature of from 300° to 450° C.

7. A method of forming an ethyl silicon halide which comprises passing a vapor mixture of ethyl halide and a gaseous hydrogen halide into contact with silicon while heating the resultant mixture at a reaction temperature below 550° C.

8. A method of forming an ethyl silicon chloride which comprises passing a vapor mixture of ethyl chloride and gaseous hydrogen chloride into contact with silicon while heating the resultant mixture at a reaction temperature of from 200° to 400° C.

9. A method of forming mono-ethyl dichlorosilane which comprises passing a vapor mixture of ethyl chloride and gaseous hydrogen chloride into contact with silicon while heating the resultant mixture at a reaction temperature of from 200° to 400° C.

10. In a process for making an alkyl silicon halide, the steps which comprise passing a vapor mixture of an alkyl halide containing less than four carbon atoms in the molecule and a gaseous hydrogen halide into contact with silicon while heating the mixture at a reaction temperature of from 200° to 550° C., recirculating a portion of the reaction products through the bed of heated silicon and withdrawing another portion of the products.

11. The method of forming an alkyl silicon halide which comprises passing a vapor mixture of an alkyl halide containing less than four carbon atoms in the molecule and a gaseous hydrogen halide into contact with silicon while heating the resultant mixture at a reaction temperature of from 200° to 450° C., recirculating a portion of the reaction products over the heated silicon, and withdrawing another portion of the products.

12. The method of forming a methyl silicon chloride which comprises passing a vapor mixture of methyl chloride and hydrogen chloride into contact with a silicon alloy while heating the resultant mixture at a reaction temperature of from 300° to 450° C., recirculating a portion of the reaction products through the bed of heated silicon alloy and withdrawing another portion of the products.

13. The method of forming an ethyl silicon chloride which comprises passing a vapor mixture of ethyl chloride and hydrogen chloride into contact with silicon while heating the mixture at a reaction temperature of from 200° to 450° C., recirculating a portion of the reaction products through the bed of heated silicon and withdrawing another portion of the products.

14. The method of forming an alkyl silicon halide which comprises reacting a mixture of an alkyl halide containing less than four carbon atoms in the molecule and a hydrogen halide with silicon at a temperature of from 200° to 500° C.

15. The method of forming an alkyl silicon halide which comprises passing a mixture of an alkyl halide containing less than four carbon atoms in the molecule and a hydrogen halide over heated silicon.

ARTHUR J. BARRY.
LEE DE PREE.

REFERENCES CITED

The following references are of record in the file of this patent:

UNITED STATES PATENTS

| Number | Name | Date |
|---|---|---|
| 2,380,995 | Rochow | Aug. 7, 1945 |
| 2,380,996 | Rochow | Aug. 7, 1945 |
| 2,380,997 | Patnode | Aug. 7, 1945 |
| 2,380,998 | Sprung | Aug. 7, 1945 |
| 2,380,999 | Sprung | Aug. 7, 1945 |
| 2,381,000 | Patnode | Aug. 7, 1945 |
| 2,381,001 | Patnode | Aug. 7, 1945 |
| 2,381,002 | Patnode | Aug. 7, 1945 |
| 2,383,818 | Patnode | Aug. 28, 1945 |
| 2,389,931 | Reed et al. | Nov. 27, 1945 |

OTHER REFERENCES

Rochow, Jour. Amer. Chem. Soc., vol. 67 (1945), page 1772.